United States Patent
Roberge et al.

(10) Patent No.: US 9,614,237 B2
(45) Date of Patent: Apr. 4, 2017

(54) DEVICE FOR THE TRANSFER OF WATER AND HEAT BETWEEN TWO AIR FLOWS AND USE THEREOF FOR THE HUMIDIFICATION OF FUEL CELL INLET GAS

(75) Inventors: Guillaume Roberge, Bourgoin (FR); Pierre Charlat, Lan En Vercors (FR); Thierry Novet, Bernin (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 2490 days.

(21) Appl. No.: 10/568,721

(22) PCT Filed: Sep. 9, 2004

(86) PCT No.: PCT/FR2004/050419
§ 371 (c)(1),
(2), (4) Date: Sep. 26, 2006

(87) PCT Pub. No.: WO2005/027251
PCT Pub. Date: Mar. 24, 2005

(65) Prior Publication Data
US 2007/0104987 A1   May 10, 2007

(30) Foreign Application Priority Data
Sep. 16, 2003   (FR) .................................... 03 50542

(51) Int. Cl.
*H01M 8/02*   (2016.01)
*H01M 8/04119*   (2016.01)
(Continued)

(52) U.S. Cl.
CPC ..... *H01M 8/04119* (2013.01); *H01M 8/0236* (2013.01); *H01M 8/0239* (2013.01);
(Continued)

(58) Field of Classification Search
CPC ............. H01M 8/2036; H01M 8/0239; H01M 8/0243; H01M 8/0245; H01M 8/0267;
(Continued)

(56) References Cited

U.S. PATENT DOCUMENTS 6,783,882 B2 * 8/2004 Schmidt .......................... 429/34
2001/0004500 A1 * 6/2001 Grasso et al. .................. 429/13
(Continued)

FOREIGN PATENT DOCUMENTS

EP   1 298 749   4/2003
FR   2 828 011   1/2003

OTHER PUBLICATIONS

International Search Report for PCT/FR2004/050419.
Patent Abstracts of Japan, vol. 1995, No. 08, Sep. 29, 1995, & JP 07 135012, May 23, 1995.

*Primary Examiner* — Stephen Yanchuk
(74) *Attorney, Agent, or Firm* — Christopher J. Cronin

(57) ABSTRACT

The invention relates to a device for the transfer of water and heat between a first and a second air flow. The inventive device consists of a stack of at least two transfer subassemblies having a lamellar configuration, each sub-assembly comprising a two-layer transfer structure with hydrophilic porous materials (3, 4), which is disposed between a first structure for the distribution of the first air flow (1) and a second structure for the distribution of the second air flow (2).

12 Claims, 2 Drawing Sheets

Figure 1:
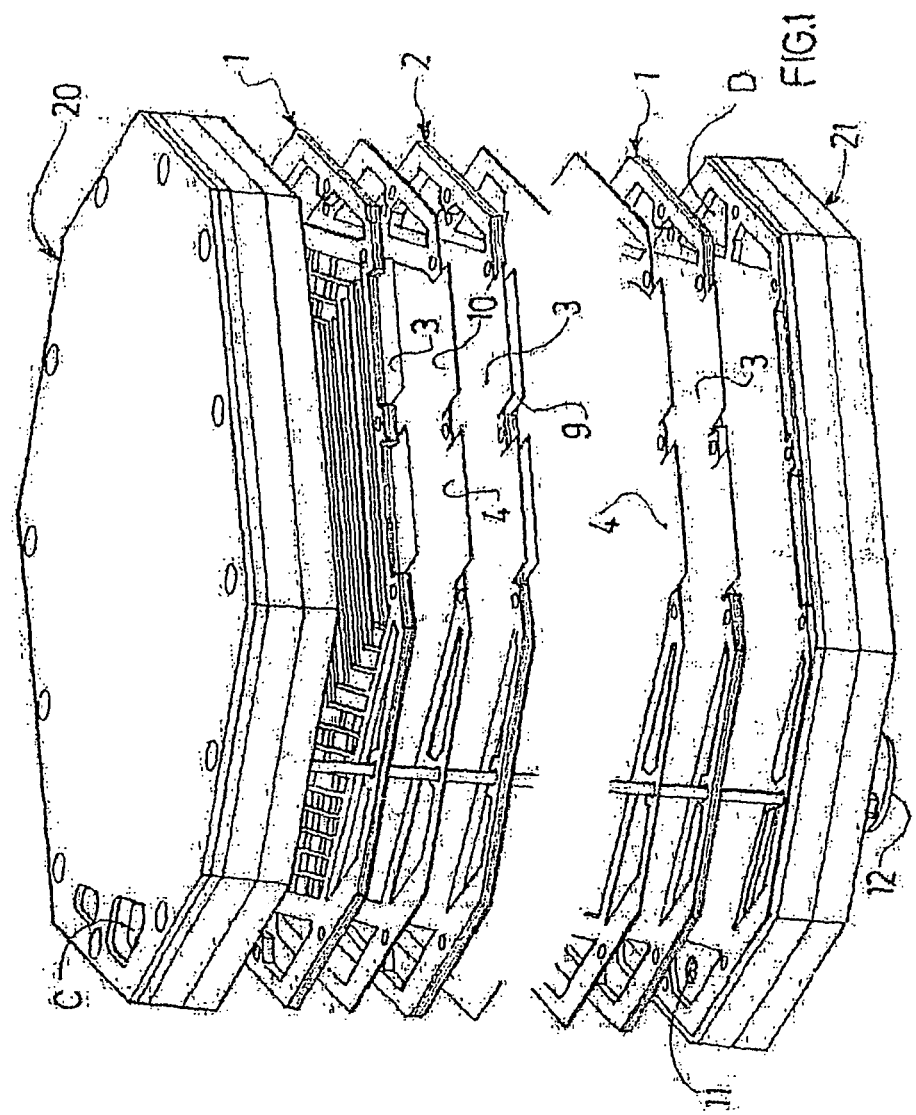

(51) Int. Cl.
*H01M 8/0236* (2016.01)
*H01M 8/0239* (2016.01)
*H01M 8/0243* (2016.01)
*H01M 8/0245* (2016.01)
*H01M 8/0267* (2016.01)
*H01M 8/0202* (2016.01)
*H01M 8/0213* (2016.01)

(52) U.S. Cl.
CPC ....... *H01M 8/0243* (2013.01); *H01M 8/0245* (2013.01); *H01M 8/0267* (2013.01); *H01M 8/0269* (2013.01); *H01M 8/0213* (2013.01); *Y02E 60/50* (2013.01)

(58) Field of Classification Search
CPC ........... H01M 8/0269; H01M 8/04119; H01M 8/0213; Y02E 60/50
USPC .............................................. 429/26, 34, 413
See application file for complete search history.

(56) References Cited

U.S. PATENT DOCUMENTS

| | | | |
|---|---|---|---|
| 2001/0046616 A1* | 11/2001 | Mossman | 429/13 |
| 2002/0063345 A1* | 5/2002 | Kambe et al. | 261/102 |
| 2002/0172854 A1 | 11/2002 | Hartnack et al. | |
| 2004/0115489 A1* | 6/2004 | Goel | 429/13 |
| 2004/0170878 A1* | 9/2004 | Goebel | 429/26 |
| 2004/0234833 A1* | 11/2004 | Hartnack et al. | 429/32 |
| 2004/0265673 A1* | 12/2004 | Richardson et al. | 429/35 |
| 2005/0008910 A1* | 1/2005 | Lee | 429/26 |
| 2005/0084731 A1* | 4/2005 | Nishimura et al. | 429/34 |
| 2005/0112430 A1* | 5/2005 | Nuttall et al. | 429/26 |
| 2007/0007674 A1* | 1/2007 | Hasegawa et al. | 261/104 |

\* cited by examiner

DEVICE FOR THE TRANSFER OF WATER AND HEAT BETWEEN TWO AIR FLOWS AND USE THEREOF FOR THE HUMIDIFICATION OF FUEL CELL INLET GAS

The present invention relates to devices for transferring water and heat between a first and a second air flow and the use thereof for humidifying the air feed to a fuel cell.

A fuel cell air feed installation comprising a device for transferring water and heat between the cathode air inlet and outlet circuits is described in document FRA-A-2 828 011, in the name of the applicant.

It is the object of the present invention to propose an improved device of this type, with a compact structure and reduced assembly costs, and having greater efficiency with low pressure drops.

For this purpose, according to one feature of the invention, the water and heat transfer device comprises a stack of at least two transfer subassemblies having a lamellar configuration, each comprising a transfer structure with hydrophilic porous materials arranged between a first structure for distributing the first air flow and a second structure for distributing the second air flow.

According to more particular features of the invention:

The transfer structure comprises at least one microporous layer and one macroporous layer, advantageously provided in the form of a support layer with long fibers, typically woven.

The porous layers of one subassembly are in local contact with the porous layers of an adjacent subassembly.

The stack is mounted pressed between fluid distribution bodies provided with members for connection to circuitry, particularly air and water circuits, for humidifying the air feed to a fuel cell.

Figure 2:
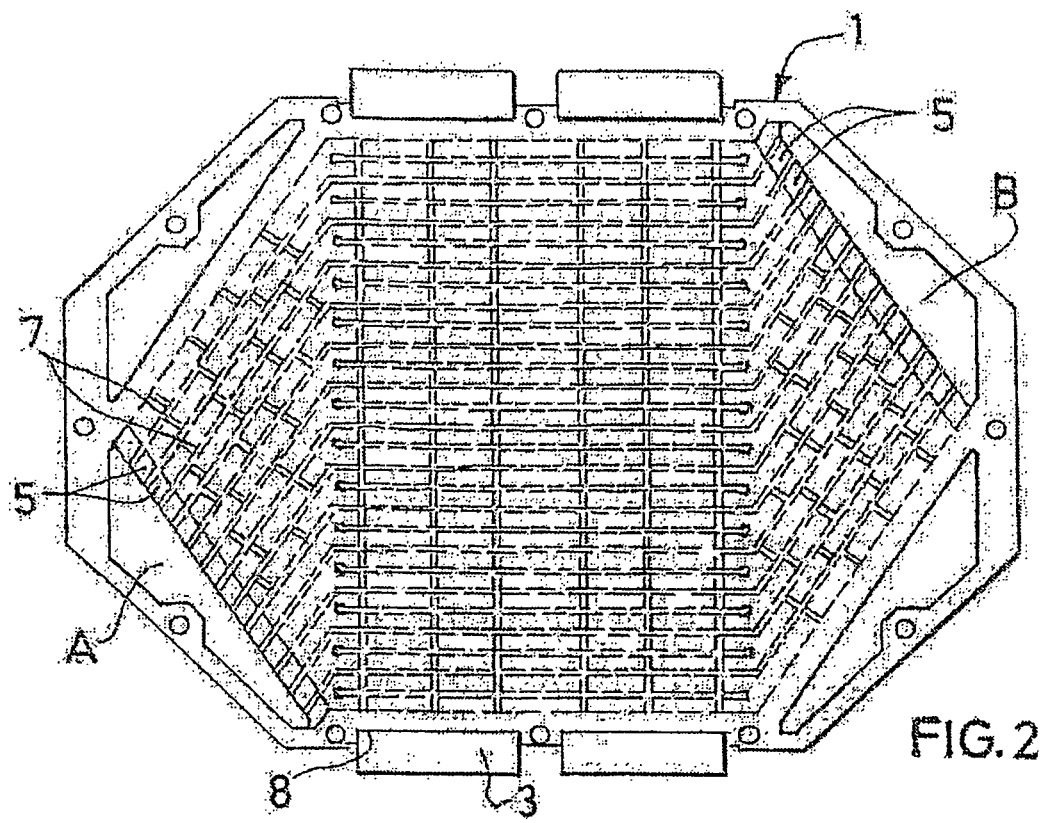
Figure 3:
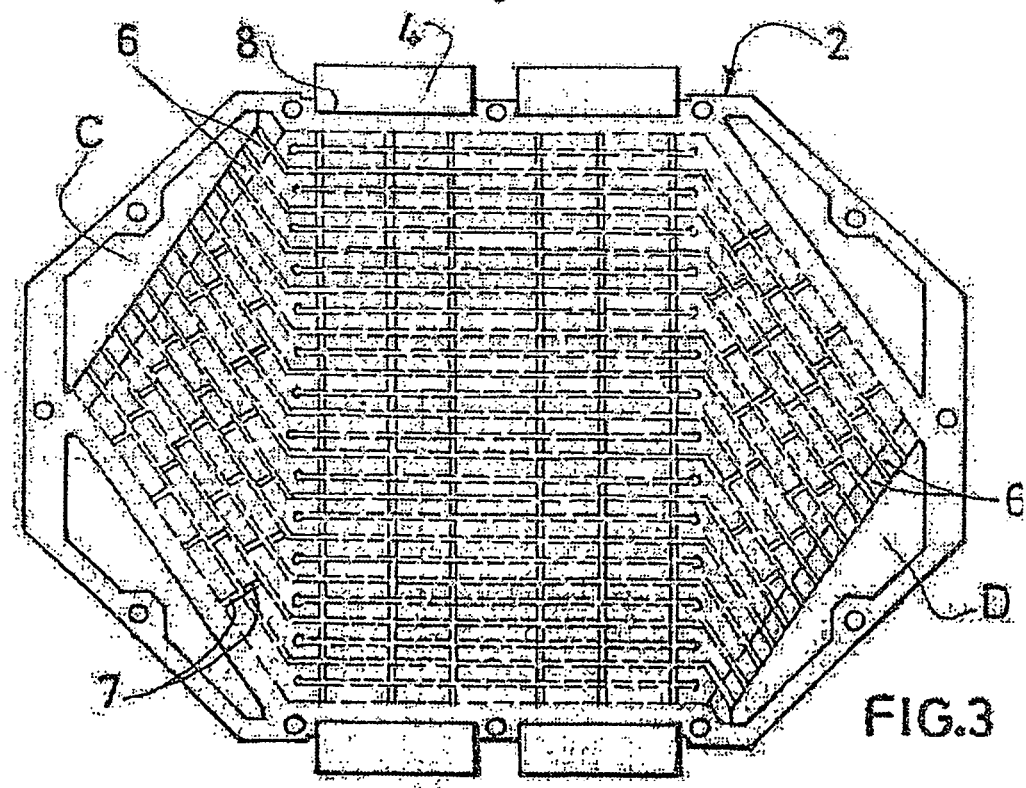

Other features and advantages of the invention will appear from the following description of embodiments, provided for illustration but nonlimiting, in relation to the appended drawings, in which:

FIG. 1 is a partial schematic perspective and exploded view of an embodiment of a device according to the invention; and FIGS. 2 and 3 are plan views of the distribution structures of the first and second air flows of the device in FIG. 1.

As shown in FIG. 1, the device according to the invention essentially comprises a stack of transfer subassemblies having lamellar configurations, each comprising a porous transfer structure inserted between a first structure for distributing the first air flow (or evaporation cell) 1 and a second structure for distributing the second air flow (or condensation cell) 2.

More precisely, the transfer structure of hydrophilic porous material comprises at least one hydrophilic microporous layer 3 in contact with a hydrophilic macroporous layer 4.

In the example shown in FIG. 1, each macroporous layer 4, typically made from woven long glass or cellulose fibers, advantageously a tightly woven fiberglass fabric, is inserted between two microporous layers or membranes 3, typically made from a sintered hydrophilic plastic, advantageously of polyethersulfone (PES), bounding the transfer structures at the top and bottom.

Besides its intrinsic water transport role, the macroporous layer has a mechanical support role to provide a separation between the two microporous layers and thereby guarantee the presence of a capillary film between these two capillary walls, and also to mechanically support these microporous layers, in order to suitably withstand the pressure difference between the compartments.

The fabric preferably selected for this purpose is a fabric of which the very long fibers remain stretched under pressure and limit the irreversible deformation of the microporous layers, while guaranteeing a transverse transport of the liquid water within the three-layer structure, and transporting the excess water produced in certain parts to the zones with insufficient water.

Each layer of the stack is typically between 1 and 5 mm thick, the pore size of the macroporous layers being between 50 and 250 microns and that of the microporous layers not exceeding 5 microns.

As shown in FIGS. 2 and 3, the fluid transfer structures consist of at least one, typically two polycarbonate layers, forming the image of one another by central symmetry and therefore obtainable using the same mold. Each layer consists of a frame bounding the exchange zone in which four collector holes A-D are arranged for the passage of the feed gases.

For optimized countercurrent exchange between the air flows, air guide channels 5 and 6 originate from two opposite collector holes (A to B in FIG. 2 and C to D in FIG. 3), intersected in a pattern determined by flow return partitions 7 offset from one passage to the other and suitable for making flow restrictions guaranteeing a turbulent air flow. The restrictions are arranged so that each passage has the same number of restrictions, thereby obtaining good control of the air distribution between the various passages.

The peripheral frame comprises recessed cutouts 8 for exposing projecting lateral zones 9 and 10 of the porous structures 3 and 4, so that, in an assembled configuration of the layers and subassemblies, a capillary relation of the various porous layers is maintained, allowing the distribution of the liquid water between these elements and the outward removal of the excess water produced in the transfer device. This outward removal of the excess water produced prevents flooding of the porous layers, and also, thanks to the distribution thus obtained in all the layers of the excess liquid water produced in the cell, prevents the dewatering of the zones containing insufficient water. Also obtained is a phase separation function in the condensation part, where the liquid water is "sucked out" via the contact zones 9 and 10 and flows by gravity to the bottom of the device for removal via the outlet 12.

The stack of transfer and distribution structures, peripherally bonded, is pressed between end distribution bodies 20 and 21, typically also made from polycarbonate or PMMA, having slots for connection to fluid circuits of the fuel cell. In the embodiment shown, the collector C is the collector of the condensation stream for the wet gas that is introduced at the base via an inlet 10 and depleted of oxygen, that is, for the depleted air outlet of the fuel cell. This collector also has a phase separator function, the excess liquid water of the condensation stream falling downward in the lower end body for removal via a drain hole 11. The collector D is the inlet collector of the condensation stream, that is, the very wet air outlet of the cell. Correlatively, as shown in FIG. 2, the collector A is the inlet collector in the evaporation stream, that is, of the dry gas flow issuing from the air compressor supplying the cell, collector B being the outlet collector of the evaporation stream, that is, of the air humidified in the device according to the invention and fed to the cell to supply it with oxygen.

After assembly, the device is peripherally enveloped in an airtight film, for example of cellophane or polyurethane, to prevent the dewatering of the porous layers during periods during which the fuel cell is not used.

Although the invention has been described in relation to particular embodiments, it is not limited thereto, but is susceptible to modification or variants that will appear to a person skilled in the art in connection with the claims below.

In particular, in the case in which the capillary properties of the macroporous layer and the residual water film between this layer and the adjacent microporous layer permit sufficient transport of the liquid water, or in the case in which the pressure in the condensation structures 2 is very close to atmospheric pressure, there is no need to provide a seal between the macroporous layer and this transfer structure, thereby eliminating one of the microporous layers 3 with high bubble points on the condensation structure side. In this case, the macroporous layer 4 must have a higher bubble point pressure than the pressure difference between the condensation structure and atmospheric pressure.

The invention claimed is:

1. A device for transferring water and heat between a first air flow and a second air flow, comprising a stack of at least two transfer subassemblies having a lamellar configuration, each of said transfer subassemblies comprising:
   a first structure comprising channels for distributing the first air flow;
   a second structure comprising channels for distributing the second air flow;
   one macroporous hydrophilic layer; and
   two microporous hydrophilic layers, wherein said one macroporous hydrophilic layer is sandwiched between said two microporous hydrophilic layers to form a three-layer structure and said three-layer structure is sandwiched between said first and second structures.

2. The device of claim 1, characterized in that the macroporous layer is a support layer made from a material with fibers.

3. The device of claim 2, characterized in that the fibers are cellulose or glass fibers.

4. The device of claim 2, characterized in that the fibers are woven.

5. The device of claim 2, characterized in that the macroporous layer has a pore size of between 50 and 250 μm.

6. The device of claim 1, characterized in that the microporous layer has a pore size not exceeding 5 microns.

7. The device of claim 6, characterized in that the microporous layer is made from polyethersulfone (PES).

8. The device of claim 1, characterized in that each of the hydrophilic layers is not more than 5 mm thick.

9. The device of claim 1, characterized in that each of said first and second structures comprises a molded polycarbonate plate having the air channels formed therein.

10. The device of claim 9, characterized in that the hydrophilic layers of one of said subassemblies are in contact with the hydrophilic layers of an adjacent one of said subassemblies via contact zones laterally projecting from the polycarbonate plate.

11. The device of claim 1, characterized in that the stack is peripherally enveloped in an airtight film.

12. The device of claim 1, characterized in that the stack is pressed between fluid distribution bodies provided with members for connection to fluid circuits of a fuel cell.

* * * * *